(12) United States Patent
Chen et al.

(10) Patent No.: US 9,788,306 B2
(45) Date of Patent: Oct. 10, 2017

(54) WIRELESS COMMUNICATION METHOD, BASE STATION, AND TERMINAL

(71) Applicant: Huawei Technologies Co., Ltd., Shenzhen (CN)

(72) Inventors: Xiaobo Chen, Beijing (CN); Yang Li, Beijing (CN); Lei Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 14/557,002

(22) Filed: Dec. 1, 2014

(65) Prior Publication Data
US 2015/0085723 A1 Mar. 26, 2015

Related U.S. Application Data

(63) Continuation of application No. PCT/CN2013/076530, filed on May 31, 2013.

(30) Foreign Application Priority Data

Jun. 1, 2012 (CN) .......................... 2012 1 0178970

(51) Int. Cl.
*H04L 5/00* (2006.01)
*H04B 7/26* (2006.01)
(Continued)

(52) U.S. Cl.
CPC ...... *H04W 72/0413* (2013.01); *H04B 7/2656* (2013.01); *H04L 5/0094* (2013.01); *H04L 5/14* (2013.01); *H04W 72/042* (2013.01); *H04L 5/001* (2013.01); *H04L 5/1469* (2013.01); *H04W 72/0446* (2013.01)

(58) Field of Classification Search
CPC .............. H04J 11/0056; H04L 27/2602; H04L 27/2613; H04L 1/1854; H04L 1/1607; H04W 24/02; H04W 72/12; H04W 72/04
See application file for complete search history.

(56) References Cited

U.S. PATENT DOCUMENTS

2009/0122736 A1  5/2009  Damnjanovic et al.
2009/0201838 A1  8/2009  Zhang et al.
(Continued)

FOREIGN PATENT DOCUMENTS

CA  2817673 A1  5/2012
CN  101926214 A  12/2010
(Continued)

OTHER PUBLICATIONS

"Relay frame structure design of TDD mode," 3GPP TSG RAN WG1 Meeting #56bis, Seoul, Korea, R1-091270, 3$^{rd}$ Generation Partnership Project, Valbonne, France (Mar. 23-27, 2009).
(Continued)

*Primary Examiner* — Redentor Pasia
*Assistant Examiner* — Peter Mak
(74) *Attorney, Agent, or Firm* — Leydig, Voit & Mayer, Ltd.

(57) ABSTRACT

In one method, a base station sends configuration notification information to a terminal, so as to notify the terminal to set at least one radio frame meet a first subframe configuration, where the first subframe configuration includes N−1 downlink subframes, one special subframe, and zero uplink subframe. In another method, third radio frame configuration information is sent to a terminal, and second dynamic subframe indication information is sent to the terminal, so that at least one fourth radio frame is set to meet a third subframe configuration, or is set to meet a fourth subframe configuration, or at least one fifth radio frame is set to meet a fourth subframe configuration, where the third subframe configuration includes zero downlink subframe, zero special subframe, and N uplink subframes, and the fourth subframe configuration includes zero downlink subframe, one special subframe, and N−1 uplink subframes.

20 Claims, 6 Drawing Sheets

(51) Int. Cl.
*H04W 72/04* (2009.01)
*H04L 5/14* (2006.01)

(56) References Cited

U.S. PATENT DOCUMENTS

| | | | |
|---|---|---|---|
| 2009/0249153 A1 | 10/2009 | Zhang | |
| 2009/0274078 A1* | 11/2009 | Zhao | H04W 72/0413 370/293 |
| 2010/0238847 A1 | 9/2010 | Suo et al. | |
| 2013/0194980 A1* | 8/2013 | Yin | H04L 1/1854 370/280 |
| 2013/0286902 A1* | 10/2013 | Chen | H04W 24/02 370/280 |
| 2014/0204922 A1* | 7/2014 | Kim | H04J 3/12 370/336 |
| 2015/0103704 A1* | 4/2015 | Skov | H04W 72/0446 370/280 |

FOREIGN PATENT DOCUMENTS

| | | |
|---|---|---|
| CN | 102064879 A | 5/2011 |
| CN | 102131295 A | 7/2011 |
| CN | 102263720 A | 11/2011 |
| JP | 2011512097 A | 4/2011 |
| JP | 2011521500 A | 7/2011 |
| RU | 2438256 C2 | 12/2011 |
| WO | WO 2009120701 A2 | 10/2009 |
| WO | WO 2009157699 A2 | 12/2009 |
| WO | WO 2011098844 A1 | 8/2011 |
| WO | WO 2011147167 A1 | 12/2011 |
| WO | WO 2012065287 A1 | 5/2012 |

OTHER PUBLICATIONS

"Downlink Control Signalling for TDD," 3GPP TSG RAN1 #52, Sorrento, Italy, R1-080726, $3^{rd}$ Generation Partnership Project, Valbonne, France (Feb. 11-15, 2008).

"Paging subframe pattern for TDD," 3GPP TSG RAN WG2 #61bis, Shenzhen, China, R2-081995, $3^{rd}$ Generation Partnership Project, Valbonne, France (Mar. 31-Apr. 4, 2008).

"Evaluation on TDD UL-DL reconfiguration for isolated Pico scenario," 3GPP TSG RAN WG1 Meeting #68, Dresden, Germany, R1-120118, $3^{rd}$ Generation Partnership Project, Valbonne, France (Feb. 6-10, 2012).

* cited by examiner

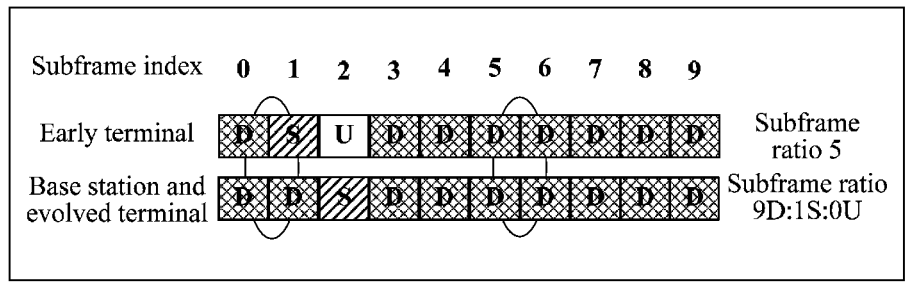

FIG. 3B

A terminal receives radio frame configuration information sent by a base station, where the radio frame configuration information is used for notifying the terminal of setting at least one radio frame to a first radio frame that meets a first subframe configuration, and the first radio frame that meets the first subframe configuration includes N-1 downlink subframes, one special subframe, and zero uplink subframe, where N is a total quantity of subframes included in one radio frame and N is a natural number greater than 1 — 41

After the terminal sets, according to the configuration notification message, the at least one radio frame to the first radio frame that meets the first subframe configuration, the terminal communicates with the base station in the first radio frame by using the first subframe configuration — 42

FIG. 4

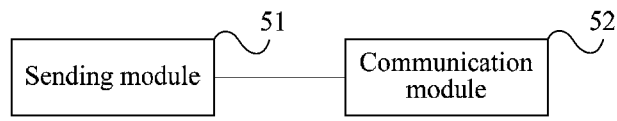

FIG. 5

WIRELESS COMMUNICATION METHOD, BASE STATION, AND TERMINAL

CROSS-REFERENCE TO RELATED APPLICATION

This application is a continuation of International Patent Application No. PCT/CN2013/076530, filed on May 31, 2013, which claims priority to Chinese Patent Application No. 201210178970.1, filed on Jun. 1, 2012, both of which are hereby incorporated by reference in their entireties.

TECHNICAL FIELD

Embodiments of the present invention relate to communication technologies, and in particular, to a wireless communication method, a base station, and a terminal.

BACKGROUND

In a 3rd Generation Partnership Project (3GPP) Long Term Evolution (LTE) time division duplex (TDD) system, one radio frame has a length of 10 ms, and includes 10 subframes. A length of each subframe is 1 ms, and a subframe may be configured by a network side device to transmit downlink data or uplink data. The LTE TDD system supports seven different subframe configurations. In a downlink subframe, a network device may send a downlink data packet to a user equipment; and in an uplink subframe, the user equipment may send an uplink data packet to the network device. In a special subframe, the network device may send a downlink data packet to the user equipment, but the user equipment cannot send an uplink data packet to the network device; therefore, the special subframe is generally also regarded as a downlink subframe.

The 3GPP LTE system is an ever evolving system, and currently, a network device notifies, by using a system broadcast message, a user equipment that which subframe configuration of the seven subframe configurations is used. A change to a subframe configuration is completed by undergoing a process of updating a system message. Considering bursty uplink and downlink services, it is often required that the subframe configuration can be rapidly changed in the case of a relatively small number of users, so as to better match a characteristic of current service traffic. The subframe configuration may often be changed every hundreds of milliseconds, and even be changed every ten milliseconds. A method for dynamically changing the subframe configuration according to an instantaneous service requirement of a user includes: setting, by a base station, at least one downlink subframe, at least one uplink subframe, and at least one dynamic subframe in each radio frame for a user equipment, where each dynamic subframe can be dynamically used for downlink data transmission or uplink data transmission according to a requirement, so as to support dynamic switching between the current seven LTE TDD subframe configurations. A dynamic change to the subframe configuration is mainly applied indoors or applied to small cells covered by hotspots, and such cells generally have a small coverage radius and serve a relatively small number of users.

When a user served in a cell currently has an uplink service, for example, video monitoring, and when a dynamic subframe is used as an uplink subframe for transmitting the uplink service in the prior art, only 60% uplink subframes can be provided, and downlink subframes that account for 40% of a radio frame are idle subframes; and when the user served in the cell currently has a downlink service, for example, file downloading, and when the dynamic subframe is used as a downlink subframe for transmitting the downlink service in the prior art, at most only 90% downlink subframes can be provided, and uplink subframes that account for 10% of the radio frame are idle subframes. Therefore, a method for dynamically changing a subframe configuration in the prior art cannot be better adapted to an uplink-dominated service and a downlink-dominated service, and some subframes cannot be used.

SUMMARY

Embodiments of the present invention provide a wireless communication method, a base station, and a terminal, which are used to eliminate a deficiency of a subframe waste existing in a subframe configuration provided by the prior art.

According to one aspect, the present invention provides a wireless communication method, including:

sending, by a base station, configuration notification information to a terminal, where the configuration notification information is used for notifying the terminal of setting a first radio frame to meet a first subframe configuration, and the first radio frame that meets the first subframe configuration includes N−1 downlink subframes, one special subframe, and zero uplink subframe, where N is a total quantity of subframes included in one radio frame and N is a natural number greater than 1; and communicating, by the base station, with the terminal in the first radio frame by using the first subframe configuration.

According to one aspect, the present invention further provides a wireless communication method, including:

receiving, by a terminal, configuration notification information sent by a base station, where the configuration notification information is used for notifying the terminal of setting a first radio frame to meet a first subframe configuration, and the first radio frame that meets the first subframe configuration includes N−1 downlink subframes, one special subframe, and zero uplink subframe, where N is a total quantity of subframes included in one radio frame and N is a natural number greater than 1;

setting, by the terminal according to the configuration notification information, the first radio frame to meet the first subframe configuration; and communicating, by the terminal, with the base station in the first radio frame by using the first subframe configuration.

According to one aspect, the present invention further provides a base station, including:

a sending module, configured to send configuration notification information to a terminal, where the configuration notification information is used for notifying the terminal of setting a first radio frame to meet a first subframe configuration, and the first radio frame that meets the first subframe configuration includes N−1 downlink subframes, one special subframe, and zero uplink subframe, where N is a total quantity of subframes included in one radio frame and N is a natural number greater than 1; and a communication module, configured to communicate with the terminal in the first radio frame by using the first subframe configuration.

According to one aspect, the present invention further provides a terminal, including:

a receiving module, configured to receive configuration notification information sent by a base station, where the configuration notification information is used for notifying the terminal of setting a first radio frame to meet a first subframe configuration, and the first radio frame that meets the first subframe configuration includes N−1 downlink subframes, one special subframe, and zero uplink subframe, where N is a total quantity of subframes included in one radio frame and N is a natural number greater than 1;

a configuration module, configured to set, according to the configuration notification information received by the receiving module, the first radio frame to meet the first subframe configuration; and a communication module, configured to communicate with the base station in the first radio frame by using the first subframe configuration, where the first radio frame is set by the configuration module.

By using the foregoing technical solutions provided by the present invention, one or more radio frames configured by a base station for a terminal include N−1 downlink subframes, one special subframe, and zero uplink subframe. The radio frame including N subframes provides N−1 downlink subframes, which increases a downlink transmission resource and reduces a waste of a radio resource, thereby better adapting to a requirement of a terminal for which a downlink service is a dominated service.

According to another aspect, the present invention provides another wireless communication method, including:

sending, by a base station, third radio frame configuration information to a terminal, where the third radio frame configuration information notifies the terminal of setting a fourth radio frame to include n uplink subframes and N−n dynamic subframes, or setting a fifth radio frame to include n−1 uplink subframes, one special subframe, and N−n dynamic subframes, where N is a total quantity of subframes included in one radio frame, N is a natural number greater than 1, and n is a natural number less than N;

sending, by the base station, second dynamic subframe indication information to the terminal, where the second dynamic subframe indication information is used for indicating, to the terminal, a transmission direction of each dynamic subframe in the fourth radio frame, so that the fourth radio frame is set to a sixth radio frame that meets a third subframe configuration, or the fourth radio frame is set to a seventh radio frame that meets a fourth subframe configuration; or the second dynamic subframe indication information is used for indicating, to the terminal, a transmission direction of each dynamic subframe in the fifth radio frame, so that the fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes; and communicating, by the base station, with the terminal in the sixth radio frame by using the third subframe configuration; or communicating, by the base station, with the terminal in the seventh radio frame by using the fourth subframe configuration.

According to another aspect, the present invention provides another wireless communication method, including:

receiving, by a terminal, third radio frame configuration information sent by a base station, where the third radio frame configuration information notifies the terminal of setting a fourth radio frame to include n uplink subframes and N−n dynamic subframes, or setting a fifth radio frame to include n−1 uplink subframes, one special subframe, and N−n dynamic subframes, where N is a total quantity of subframes included in one radio frame, N is a natural number greater than 1, and n is a natural number less than N;

according to the third radio frame configuration information, setting, by the terminal, the fourth radio frame to include the n uplink subframes and N−n dynamic subframes, or setting the fifth radio frame to include the n−1 uplink subframes, one special subframe, and N−n dynamic subframes;

receiving, by the terminal, second dynamic subframe indication information sent by the base station, where the second dynamic subframe indication information is used for indicating, to the terminal, a transmission direction of each dynamic subframe in the fourth radio frame, so that the fourth radio frame is set to a sixth radio frame that meets a third subframe configuration, or the fourth radio frame is set to a seventh radio frame that meets a fourth subframe configuration; or the second dynamic subframe indication information is used for indicating, to the terminal, a transmission direction of each dynamic subframe in the fifth radio frame, so that the fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes;

according to the second dynamic subframe indication information, setting, by the terminal, the fourth radio frame to the sixth radio frame that meets the third subframe configuration, or setting the fourth radio frame to the seventh radio frame that meets the fourth subframe configuration; or setting the fifth radio frame to the seventh radio frame that meets the fourth subframe configuration; and communicating, by the terminal, with the base station in the sixth radio frame by using the third subframe configuration; or communicating, by the terminal, with the base station in the seventh radio frame by using the fourth subframe configuration.

According to another aspect, the present invention further provides another base station, including:

a sending module, configured to send third radio frame configuration information to a terminal, where the third radio frame configuration information notifies the terminal of setting a fourth radio frame to include n uplink subframes and N−n dynamic subframes, or setting a fifth radio frame to include n−1 uplink subframes, one special subframe, and N−n dynamic subframes, where N is a total quantity of subframes included in one radio frame, N is a natural number greater than 1, and n is a natural number less than N, where the sending module is further configured to send second dynamic subframe indication information to the terminal, where the second dynamic subframe indication information is used for indicating, to the terminal, a transmission direction of each dynamic subframe in the fourth radio frame, so that the fourth radio frame is set to a sixth radio frame that meets a third subframe configuration, or the fourth radio frame is set to a seventh radio frame that meets a fourth subframe configuration; or the second dynamic subframe indication information is used for indicating, to the terminal, a transmission direction of each dynamic subframe in the fifth radio frame, so that the fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes; and a communication module, configured to communicate with the terminal in the sixth radio frame by using the third subframe configuration; or communicate with the terminal in the seventh radio frame by using the fourth subframe configuration.

According to another aspect, the present invention further provides another terminal, including:

a receiving module, configured to receive third radio frame configuration information sent by a base station, where the third radio frame configuration information notifies the terminal of setting a fourth radio frame to include n uplink subframes and N−n dynamic subframes, or setting a fifth radio frame to include n−1 uplink subframes, one special subframe, and N−n dynamic subframes, where N is a total quantity of subframes included in one radio frame, N is a natural number greater than 1, and n is a natural number less than N;

a configuration module, configured to: according to the third radio frame configuration information received by the receiving module, set the fourth radio frame to include the n uplink subframes and N−n dynamic subframes, or set the fifth radio frame to include the n−1 uplink subframes, one special subframe, and N−n dynamic subframes, where the receiving module is further configured to receive second dynamic subframe indication information sent by the base station, where the second dynamic subframe indication information is used for indicating, to the terminal, a transmission direction of each dynamic subframe in the fourth radio frame, so that the fourth radio frame is set to a sixth radio frame that meets a third subframe configuration, or the fourth radio frame is set to a seventh radio frame that meets a fourth subframe configuration; or the second dynamic subframe indication information is used for indicating, to the terminal, a transmission direction of each dynamic subframe in the fifth radio frame, so that the fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes; and the configuration module is further configured to: according to the second dynamic subframe indication information received by the receiving module, set the fourth radio frame to the sixth radio frame that meets the third subframe configuration, or set the fourth radio frame to the seventh radio frame that meets the fourth subframe configuration; or set the fifth radio frame to the seventh radio frame that meets the fourth subframe configuration; and a communication module, configured to communicate with the base station in the sixth radio frame by using the third subframe configuration, where the sixth radio frame is set by the configuration module; or communicate with the base station in the seventh radio frame by using the fourth subframe configuration, where the seventh radio frame is set by the configuration module.

By using the foregoing technical solutions provided by the present invention, a base station sets a dynamic subframe in at least one radio frame, and then, dynamically changes a transmission direction of the dynamic subframe, so that the radio frame set with the dynamic subframe is set to a sixth radio frame that includes zero downlink subframe, zero special subframe, and N uplink subframes, or is set to a seventh radio frame that includes zero downlink subframe, one special subframe, and N−1 uplink subframes. Because the base station provides the N uplink subframes in the sixth radio frame in which a total quantity of subframes is N, and provides the N−1 uplink subframes in the seventh radio frame in which a total quantity of subframes is N, when communication is performed with a terminal for which an uplink service is a dominated service, a waste of a radio resource can be reduced by using a subframe configuration of the sixth radio frame or the seventh radio frame, thereby better adapting to a requirement of the terminal for which an uplink service is a dominated service.

BRIEF DESCRIPTION OF DRAWINGS

FIG. 3B shows schematic diagrams of subframe configurations for an early terminal and an evolved terminal in the case of a first radio frame including 10 subframes according to an embodiment of the present invention;

FIG. 4 is a flowchart of still another wireless communication method according to an embodiment of the present invention;

FIG. 5 is a schematic structural diagram of a base station according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely a part of the embodiments of the present invention rather than all of the embodiments. All other embodiments obtained by persons skilled in the art based on the embodiments of the present invention shall fall within the protection scope of the present invention.

In embodiments corresponding to FIG. 1, FIG. 2, FIG. 3A, FIG. 3B, FIG. 4, FIG. 5, and FIG. 6, a subframe configuration is set for a terminal for which a downlink service is a dominated service.

Figure 1:
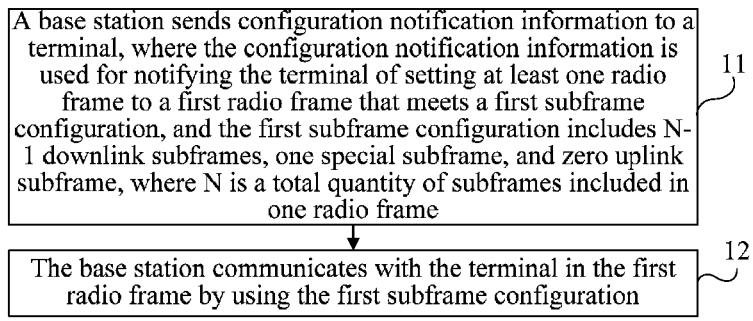
FIG. 1 is a flowchart of a wireless communication method according to an embodiment of the present invention.

FIG. 1 is a flowchart of a wireless communication method according to an embodiment of the present invention. As shown in FIG. 1, the method provided by this embodiment includes:

Step 11: A base station sends configuration notification information to a terminal, where the configuration notification information is used for notifying the terminal of setting at least one radio frame to a first radio frame that meets a first subframe configuration, and the first subframe configuration includes N−1 downlink subframes, one special subframe, and zero uplink subframe, where N is a total quantity of subframes included in one radio frame.

The base station may broadcast the configuration notification information in a cell, and may also send the configuration notification information to a specified terminal according to a service requirement of the terminal, for example, send the configuration notification information to a terminal for which a downlink service is dominated service. The base station may send the configuration notification information by using a radio resource control message, and when the base station sends the configuration notification information, effective time of the configuration notification information may further be notified. The configuration notification information may be used for notifying of setting one radio frame to the first radio frame that meets the first subframe configuration, and may also be used for notifying the terminal of setting multiple radio frames to the first radio frames that meet the first subframe configuration. The first radio frame that meets the first subframe configuration includes the N−1 downlink subframes, one special subframe, and zero uplink subframe, where N is the total quantity of subframes included in one radio frame and N is a natural number greater than 1.

Table 1 shows subframe configurations supported by an LTE TDD system provided by the present invention, where D represents a downlink subframe, U represents an uplink subframe, and S represents a special subframe. In the subframe configurations supported by the LTE TDD system and shown in Table 1, in addition to seven subframe configurations (0 to 6) supported by a system of the LTE TDD release 8, a new subframe configuration 7 is further supported. The subframe configuration 7 includes 9 downlink subframes, 1 special subframe, and 0 uplink subframe. The base station may broadcast, in a cell, configuration notification information of the subframe configuration 7 shown in Table 1, so as to notify the terminal of setting the at least one radio frame to a first radio frame that meets the subframe configuration 7. A timeslot length is represented by a quantity of orthogonal frequency division multiplexing (OFDM) symbols in Table 2.

TABLE 1

Subframe configurations supported by an LTE TDD system provided by the present invention

| Subframe configuration | Downlink-to-uplink switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

Subframe configurations supported by an LTE TDD system provided by the present invention

| Subframe configuration | Downlink-to-uplink switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | 10 ms | D | D | S | D | D | D | D | D | D | D |
| 8 | 10 ms | U | U | U | U | U | U | U | U | U | U |
| 9 | 10 ms | U | S | U | U | U | U | U | U | U | U |

Step 12: The base station communicates with the terminal in the first radio frame by using the first subframe configuration.

After receiving the configuration notification information sent by the base station, the terminal performs subframe configuration on the first radio frame according to the first subframe configuration, and sets the first radio frame to include the N−1 downlink subframes, one special subframe, and zero uplink subframe. The base station communicates with the terminal in the first radio frame by using the first subframe configuration, for example, the base station sends downlink data and downlink control information to the terminal in a downlink subframe, and the terminal receives the downlink data and the downlink control information in the downlink subframe.

According to the wireless communication method provided by this embodiment, one or more radio frames configured by a base station for a terminal include N−1 downlink subframes, one special subframe, and zero uplink subframe. The radio frame including N subframes provides N−1 downlink subframes, which increases a downlink transmission resource and reduces a waste of a radio resource, thereby better adapting to a requirement of a terminal for which a downlink service is dominated service.

Figure 2:
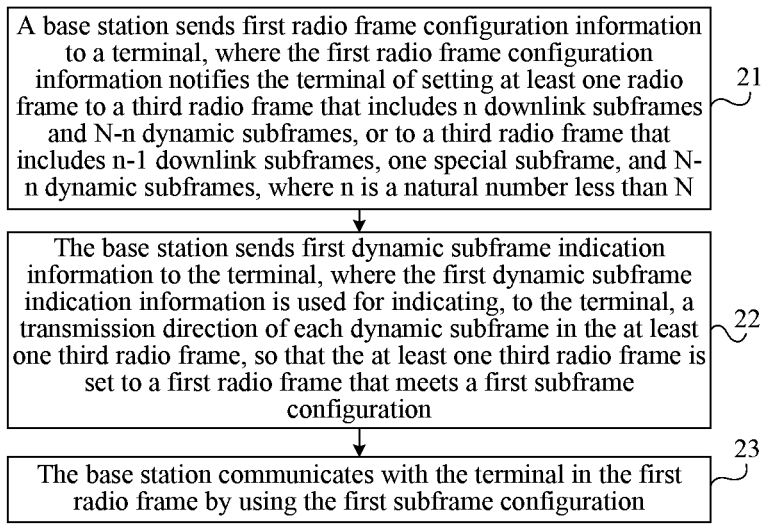
FIG. 2 is a flowchart of another wireless communication method according to an embodiment of the present invention.

FIG. 2 is a flowchart of another wireless communication method according to an embodiment of the present invention. In this embodiment, a dynamic subframe is set in a radio frame, and then, a transmission direction of the dynamic subframe is dynamically set for transmitting downlink data, so that a subframe configuration of at least one radio frame including the dynamic subframe is set to N−1 downlink subframes, one special subframe, and zero uplink subframe. As shown in FIG. 2, the method provided by this embodiment includes:

Step 21: A base station sends first radio frame configuration information to a terminal, where the first radio frame configuration information notifies the terminal of setting at least one radio frame to a third radio frame that includes n downlink subframes and N−n dynamic subframes, or to a third radio frame that includes n−1 downlink subframes, one special subframe, and N−n dynamic subframes, where n is a natural number less than N.

The base station sends the first radio frame configuration information to a specified terminal or each terminal in a cell, so that the terminal sets the at least one radio frame to the third radio frame that includes the n downlink subframes and N−n dynamic subframes, or to the third radio frame that includes the n−1 downlink subframes, one special subframe, and N−n dynamic subframes, where n is a natural number less than N, and each dynamic subframe may be used for transmitting downlink data or transmitting uplink data according to a requirement.

For an LTE TDD system, N=10. Considering the LTE TDD system is an ever evolving system, a base station supporting a dynamic subframe function also needs to be capable of supporting a terminal of an early release. Preferably, before sending the first radio frame configuration information to the terminal, the base station broadcasts a subframe configuration to the terminal by using a system message, for example, one of the uplink-downlink subframe configuration 0 to the uplink-downlink subframe configuration 6 shown in Table 1. Using the LTE TDD system as an example, one radio frame includes 10 subframes, the base station broadcasts, by using the system message, any one of the subframe configuration 0 to the subframe configuration 6 shown in Table 1, and the terminal sets a transmission direction of each subframe according to the subframe configuration broadcast in the system message. Then, the base station sends the first radio frame configuration information to a terminal supporting the dynamic subframe function, where the first radio frame configuration information has a higher subframe setting priority compared with the subframe configuration broadcast in the system message, and after receiving the first radio frame configuration message, the terminal may reset some subframes in the subframe configuration broadcast in the system message to dynamic subframes. The first radio frame configuration information may indicate, by using a 10-bit bitmap, whether each subframe in the radio frame is set to a dynamic subframe. For example, if a bit corresponding to a subframe is 1, it indicates that the subframe is set to the dynamic subframe; and if a bit corresponding to a subframe is 0, it indicates that the subframe is not set to the dynamic subframe. For a subframe that is not set to the dynamic subframe according to the first radio frame configuration information, a transmission direction thereof is a transmission direction that is determined in the subframe configuration broadcast in the system message. For example, the base station broadcasts, by using the system message, the subframe configuration 1 shown in Table 1, and dynamic subframe setting information notified in the first radio frame configuration information is 0011101111; therefore, a subframe 2 to a subframe 4 and a subframe 6 to a subframe 9 are set to dynamic subframes, and a subframe 0, a subframe 1, and a subframe 5 are set to a downlink subframe, a special subframe, and a downlink subframe respectively according to the subframe configuration 1.

Step 22: The base station sends first dynamic subframe indication information to the terminal, where the first dynamic subframe indication information is used for indicating, to the terminal, a transmission direction of each dynamic subframe in the at least one third radio frame, so that the at least one third radio frame is set to a first radio frame that meets a first subframe configuration.

After sending the first radio frame configuration information to the terminal, for the third radio frame including the dynamic subframe, the base station may dynamically set the transmission direction of the dynamic subframe according to a service requirement of the terminal. For example, when the terminal currently has a downlink-dominated service, for example, file downloading, more downlink subframes are required to transmit the downlink service, and the base station may notify, by using the first dynamic subframe indication information, the terminal of setting transmission directions of the N−n dynamic subframes to downlink, that is, using the dynamic subframes as downlink subframes, so that the third radio frame including the dynamic subframe is set to the first radio frame that includes N−1 downlink subframes, one special subframe, and zero uplink subframe, so as to meet the first subframe configuration.

For the first dynamic subframe indication information, one implementation manner is described as follows: A user terminal checks, in each dynamic subframe, whether an uplink signal needs to be transmitted. If any uplink signal (for example, uplink data or uplink control information) needs to be transmitted in a dynamic subframe, the dynamic subframe is used as an uplink subframe; otherwise, the dynamic subframe is used as a downlink subframe. Another implementation manner is: whether each dynamic subframe is used as a downlink subframe or an uplink subframe is indicated to the terminal by using physical downlink control signaling. A specific design of the first dynamic subframe indication information is not a main concern in the present invention, and is not described in detail herein.

Step 23: The base station communicates with the terminal in the first radio frame by using the first subframe configuration.

In this embodiment, the base station first sets, for the terminal, the third radio frame including the dynamic subframe, and then changes the transmission direction of the dynamic subframe according to the service requirement of the terminal, so that the at least one third radio frame including the dynamic subframe is set to the first radio frame that includes the N−1 downlink subframes, one special subframe, and zero uplink subframe. As can be known from Table 1, of a subframe configuration defined in existing LTE TDD, the subframe configuration 5 can provide the most OFDM symbols used for downlink transmission. Using a short cyclic prefix subframe structure as an example, there are 8 downlink subframes in the subframe configuration 5, and each downlink subframe can provide 14 OFDM symbols for downlink transmission. As can be seen from Table 2, a length of a DwPTS (downlink pilot timeslot) of the special subframe can be configured to 12 OFDM symbols at most, so that a total quantity of OFDM symbols used for downlink transmission is 14*8+12=124. By using a subframe configuration 9D:1S:0U provided by the embodiment of the present invention, when a configuration of the special subframe meets a condition that a length of a UpPTS (uplink pilot timeslot) is a half of a length of a subframe, and a total length of the DwPTS and a GP (guard period) is also a half of a length of a subframe, the length of the DwPTS can be configured to 6 OFDM symbols at most, the total quantity of OFDM symbols used for downlink transmission is 14*9+6=132, and the total quantity of OFDM symbols used for downlink transmission is increased by (132−124)/124=6.45%; and when the configuration of the special subframe is a configuration of the special subframe that is defined in the LTE TDD release 8, the length of the DwPTS can be configured to 12 OFDM symbols, the total quantity of OFDM symbols used for downlink transmission is 14*9+12=138 in this case, and the total quantity of OFDM symbols used for downlink transmission is increased by (138−124)/124=11.29%. That is, regarding the subframe configuration 9D:1S:0U, an available downlink transmission resource is added, which can be better applied to a downlink-dominated service, for example, file downloading.

The following describes how the base station communicates with the terminal by using the special subframe in the first radio frame having the first subframe configuration, and a method provided below is applicable to the embodiments corresponding to FIG. 1 and FIG. 2.

First, a radio frame in an existing LTE TDD system is described. In the existing LTE TDD system, a length of the radio frame is 10 ms, a length of a subframe is 1 ms, one radio frame is formed by 10 subframes, and each subframe may be set as a downlink subframe, an uplink subframe, and a special subframe. According to a cyclic prefix setting, one subframe may include 12 or 14 OFDM symbols. One downlink subframe or one uplink subframe is formed by two timeslots with a length of 0.5 ms, and each timeslot further includes 6 or 7 OFDM symbols. One special subframe includes three parts: a DwPTS, a GP, and a UpPTS. A length of each part may be configured at the base station; however, a total length of these three parts is a length of one subframe, that is, 1 ms. Table 2 shows a configuration of a timeslot length of the special subframe that is supported by the system of the LTE TDD release 8, in which the lengths of the DwPTS and the UpPTS that are represented by the quantities of OFDM symbols, and a length of the GP can be obtained by subtracting a sum of the lengths of the DwPTS and the UpPTS from the length of the subframe. In Table 2, the timeslot length is represented by the quantity of OFDM symbols.

the special subframe, for performing measurement of interference between base stations or between the base station and the terminal. When sending the sounding signal, the base station may send the sounding signal to another nearby base station, and may also send the sounding signal to a nearby terminal; and when receiving the sounding signal, the sounding signal received by the base station may be sent by another nearby base station or may be sent by a nearby terminal.

The following describes a setting of the timeslot length of the special subframe in the first radio frame.

Preferably, the timeslot length of the special subframe in at least one first radio frame meets the following conditions: the length of the UpPTS is a half of a length of a subframe, and a sum of the lengths of the DwPTS and the GP is also a half of a length of a subframe. Preferably, at least one configuration of the timeslot length of the special subframe in the first radio frame is one of configurations of the timeslot length of the special subframe that are defined in the LTE TDD release 8 and are shown in Table 2. The timeslot length of the special subframe in the first radio frame may be configured at the base station and sent to the terminal.

TABLE 2

Configuration of a timeslot length of a special subframe that is supported by a system of the LTE TDD release 8

| Configuration index of the timeslot length of the special subframe | Downlink normal cyclic prefix | | | Downlink extended cyclic prefix | | |
|---|---|---|---|---|---|---|
| | Length of the DwPTS | Length of the UpPTS | | Length of the DwPTS | Length of the UpPTS | |
| | | Uplink normal cyclic prefix | Uplink extended cyclic prefix | | Uplink normal cyclic prefix | Uplink extended cyclic prefix |
| 0 | 3 | 1 | 1 | 3 | 1 | 1 |
| 1 | 9 | | | 8 | | |
| 2 | 10 | | | 9 | | |
| 3 | 11 | | | 10 | | |
| 4 | 12 | | | 3 | 2 | 2 |
| 5 | 3 | 2 | 2 | 8 | | |
| 6 | 9 | | | 9 | | |
| 7 | 10 | | | | | |
| 8 | 11 | | | | | |

The first radio frame having the first subframe configuration includes N−1 downlink subframes and one special subframe but does not include an uplink subframe. The special subframe includes three parts: the DwPTS, the GP, and the UpPTS; and in this case, an uplink signal can be sent only by using the uplink pilot timeslot. For example, the base station receives, in the first radio frame by using the uplink pilot timeslot of the special subframe in the first radio frame, uplink control information and/or uplink data sent by the terminal, where the uplink control information includes at least one type of the following information: uplink response information, a scheduling request, and channel state information. The channel state information further includes information such as a channel quality indicator, a rank indication, and a precoding matrix indicator. The uplink control information may be transmitted through a physical uplink control channel (PUCCH) or a physical uplink shared channel (PUSCH), and the uplink data is transmitted through a PUSCH. For another example, the base station sends a sounding signal or receives a sounding signal in the first radio frame by using a resource in the guard period of As can be seen from Table 2, in the system of the LTE TDD release 8, the length of the UpPTS of the special subframe may be configured to 1 or 2 OFDM symbols. In the existing LTE TDD system, the UpPTS may be used to receive a sounding reference signal (SRS) or a short random access channel (RACH), but cannot be used to support receiving of the uplink control information and/or the uplink data by the base station in the uplink pilot timeslot. With respect to the first radio frame using the first subframe configuration, by using an embodiment provided below, it can be effectively supported that the uplink control information and/or the uplink data is transmitted in the uplink pilot timeslot of the special subframe in the first radio frame.

In a scenario of carrier aggregation and a scenario in which carrier aggregation is not configured, when the timeslot length of the special subframe in the first radio frame meets the conditions that the length of the UpPTS is a half of a length of a subframe, and the sum of the lengths of the DwPTS and the GP is also a half of a length of a subframe, one implementation method for transmitting the uplink control information and the uplink data in the uplink pilot timeslot of the special subframe is that: in the UpPTS, the PUCCH and the PUSCH may reuse channel structures, of a PUCCH and a PUSCH in an existing LTE system, in a second timeslot of a subframe. For specific descriptions of the channel structures and information carrying manners of the PUCCH and the PUSCH in the existing LTE system, reference may be made to the document "3GPP TS 36.211 v10.4.0, Evolved Universal Terrestrial Radio Access (E-UTRA), Physical Channels and Modulation (Release 10)", and details are not described herein again. Particularly, when the uplink control information includes at least one of the uplink response information and the channel state information, and the UpPTS is transmitted through the PUCCH, the channel structure of the PUCCH is a channel structure, of a PUCCH format 3 defined in the LTE release 10, in a second timeslot of a subframe, and the uplink control information is mapped only in the second timeslot of the subframe. In the LTE release 10, PUCCHs in multiple formats are defined, including a PUCCH format 1/1a/1b, a PUCCH format 2/2a/2b, and a PUCCH format 3; and particularly, when the uplink control information and/or the uplink data is transmitted in the UpPTS through the PUSCH, the uplink control information and/or the uplink data may be mapped to the PUSCH in the second timeslot of the subframe according to a mapping rule defined in the LTE system.

The embodiment of the present invention further provides a new PUCCH channel structure for transmitting the uplink control information in the uplink pilot time slot of the special subframe. A new PUCCH is located in the UpPTS of the special subframe in the first radio frame, and one new PUCCH occupies only one OFDM symbol in a time domain, and occupies one or more resource block (RB) units in a frequency domain, where one RB unit includes K consecutive RBs, and each RB unit transmits one modulation symbol. Although the new PUCCH occupies only one OFDM symbol in the time domain, multiple modulation symbols of the uplink control information can be sent by using the multiple RB units occupied in the frequency domain. It is recommended that K=1, or K is a multiple of 4. Because each RB unit transmits one modulation symbol, a quantity of RB units occupied by the new PUCCH in the frequency domain depends on a quantity of modulation symbols after code modulation are performed on the uplink control information and a quantity of modulation symbols occupied by an uplink reference signal (RS). The uplink reference signal is used for uplink channel estimation; and in an RB unit that sends the uplink reference signal, one modulation symbol with a known value may be transmitted, for example, a modulation symbol with a constant value of 1 is always transmitted. In the LTE system, a width of one RB in the frequency domain is 180 kHz, the RB is formed by 12 consecutive subcarriers, and a bandwidth of each subcarrier is 15 kHz. In each RB unit, a modulation symbol to be transmitted is processed by multiplying a constant amplitude zero auto-correlation (Constant Amplitude Zero Auto-Correlation, CAZAC) sequence of a corresponding length by the modulation symbol to be transmitted. For example, when an RB unit is formed by K=4 consecutive RBs, a corresponding CAZAC sequence length is 12*4=48.

When the timeslot length of the special subframe in the first radio frame is a configuration of the timeslot length of the special subframe that is defined in the LTE TDD release 8, the uplink control information and/or the uplink data may be sent in the UpPTS by using the new PUCCH channel structure provided by the embodiment of the present invention. When the configuration of the timeslot length of the special subframe in the first radio frame meets the conditions that the length of the UpPTS is a half of a length of a subframe, and the sum of the lengths of the DwPTS and the GP is also a half of a length of a subframe, the uplink control information and/or the uplink data may also be sent in the UpPTS by using the new PUCCH channel structure provided by the embodiment of the present invention.

Figure 3A:
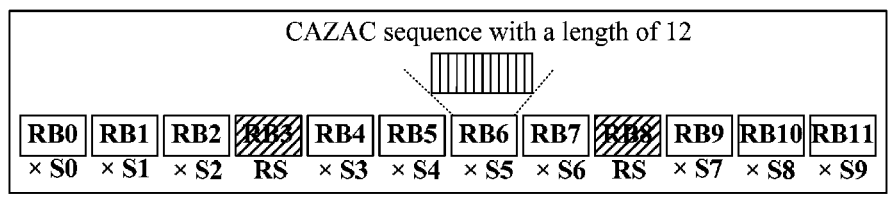
FIG. 3A is a schematic structural diagram of a new PUCCH according to an embodiment of the present invention.

When the uplink control information is the scheduling request, information carried therein can be transmitted by using one modulation symbol, and the new PUCCH channel structure may occupy only 1 RB unit in the frequency domain. When the uplink control information includes at least one of the uplink response information and the channel state information, it is recommended that the code modulation is performed on the uplink control information to obtain 10 modulation symbols, and the new PUCCH channel structure occupies more than 10 RB units in the frequency domain, where 10 RB units are used to transmit 10 modulation symbols of the uplink control information respectively, and remaining RB units are used to transmit the uplink reference signal. Considering simple design of a system, it is recommended that for all uplink control information, the new PUCCH channel structure defined in the UpPTS occupies a same quantity of RB units in the frequency domain. In this case, for the scheduling request, a same modulation symbol may be sent in all RB units. As shown in FIG. 3A, an example of the new PUCCH channel structure is given by using an example in which K=1, that is, each RB unit occupies one RB, where the new PUCCH occupies 12 RB units in the frequency domain, that is, RB0 to RB11. One RB is formed by 12 subcarriers in the frequency domain, and each RB unit occupies one RB; therefore, the length of the constant amplitude zero auto-correlation sequence is 12. The 10 modulation symbols obtained after the code modulation is performed on the uplink control information are marked as S0, S1, S2, S3, S4, S5, S6, S7, S8, and S9. The channel structure of the new PUCCH in the frequency domain is shown in FIG. 3A, where RB0, RB1, RB2, RB4, RB5, RB6, RB7, RB9, RB10, and RB11 are used to transmit the modulation symbols; and RB3 and RB8 are used to transmit the uplink reference signal.

The LTE TDD system supports a carrier aggregation technology, and the base station may configure more than one component carrier for the terminal for communication, which includes one primary component carrier (also referred to as a Primary Cell) and at least one secondary component carrier (also referred to as a Secondary Cell). In the case of carrier aggregation, when the configuration of the timeslot length of the special subframe in the first radio frame is the configuration of the timeslot length of the special subframe that is defined in the LTE TDD release 8, it is recommended that the base station sets and uses the first radio frame only on the secondary component carrier to communicate with the terminal, and does not set and use it on the primary component carrier. Therefore, during carrier aggregation, when the configuration of the timeslot length of the special subframe in the first radio frame is the configuration of the timeslot length of the special subframe that is defined in the LTE TDD release 8, the base station communicates with the terminal in the first radio frame on the secondary component carrier by using the first subframe configuration; and the base station sends uplink control information of the secondary component carrier to the terminal on the primary component carrier. If the foregoing new PUCCH channel structure is defined in the UpPTS of the special subframe in the first radio frame, even if the configuration of the timeslot length of the special subframe in the first radio frame is the configuration of the timeslot length of the special subframe that is defined in the LTE TDD release 8, the base station may set and use the first radio frame on both the primary component carrier and the secondary component carrier to communicate with the terminal.

In a scenario of carrier aggregation, when the configuration of the timeslot length of the special subframe in the first radio frame meets the following conditions: the length of the UpPTS is a half of a length of a subframe, and the sum of the lengths of the DwPTS and the GP is also a half of a length of a subframe, the base station may set and use the first radio frame on the primary component carrier, and may also set and use the first radio frame on the secondary component carrier.

The LTE TDD system is an ever evolving system, and the base station supporting the dynamic subframe function also needs to be capable of supporting a terminal of an early release; and for an evolved terminal supporting the dynamic subframe function, the terminal can also communicate with the base station when the dynamic subframe function is not enabled. In the following, a terminal supporting only a function feature of an early release is referred to as an early terminal, for example, a terminal supporting only the subframe configuration 0 to the subframe configuration 6 in Table 1 is an early terminal; and a terminal supporting the dynamic subframe and the first radio frame is referred to as an evolved terminal. For the base station, the base station may need to have a capability of providing a communication service for an early terminal and an evolved terminal at the same time. The following describes how the base station provides the communication service for the early terminal and the evolved terminal at the same time.

Preferably, before the sending, by a base station, configuration notification information to a terminal, so as to notify the terminal of setting at least one radio frame to a first radio frame that meets a first subframe configuration, the method further includes: sending, by the base station, second radio frame configuration information to the terminal by using a system message, for notifying the terminal of setting the at least one radio frame to a second radio frame that meets a second subframe configuration, where the second radio frame that meets the second subframe configuration includes N−2 downlink subframes, 1 special subframe, and 1 uplink subframe, where the special subframe in the first radio frame is aligned with the uplink subframe in the second radio frame in the time domain, and a downlink subframe before the special subframe in the first radio frame is aligned with the special subframe in the second radio frame in the time domain.

The second radio frame configuration information is sent by the base station to all terminals, and a subframe configuration notification method in the system of the LTE TDD release 8 can be reused, that is, the terminals are notified, in a subframe configuration indication field carried in a system information block 1, of using the subframe configuration 5 in Table 1, that is, the radio frame includes 8 downlink subframes, 1 special subframe, and 1 uplink subframe. The configuration notification information for setting the first radio frame cannot be received and parsed by the early terminals, and the base station only needs to notify some or all of evolved terminals. The early terminals communicate with the base station by using the second subframe configuration; and the evolved terminals communicate with the base station in the first radio frame by using the first subframe configuration only after receiving the configuration notification information for setting the first radio frame. In the first radio frame, the base station communicates with all the terminals by using the first subframe configuration; however, the base station communicates with the early terminals by disguising the first subframe configuration as the second subframe configuration, which can be implemented by aligning the special subframe in the first subframe configuration with the uplink subframe in the second subframe configuration in the time domain, and aligning the downlink subframe before the special subframe in the first subframe configuration with the special subframe in the second subframe configuration in the time domain.

FIG. 3B shows schematic diagrams of subframe configurations for an early terminal and an evolved terminal in the case of a first radio frame including 10 subframes according to an embodiment of the present invention. For the first radio frame, a subframe configuration 7, that is, a subframe configuration 9D:1S:0U, is a first subframe configuration, and is not defined in the release 8 to the release 10 of published LTE standards documents. A second subframe configuration is specifically the subframe configuration 5 that is defined in the release 8 to the release 10 of the published LTE standards documents and shown in Table 1. A special subframe in the subframe configuration 7 is aligned with an uplink subframe in the subframe configuration 5 in the time domain, that is, they have a same subframe index 2 in the radio frame; and a downlink subframe before the special subframe in the subframe configuration 7 is aligned with a special subframe in the subframe configuration 5 in the time domain, that is, they have a same subframe index 1 in the radio frame. Therefore, a subframe 2 is regarded as an uplink subframe by the early terminal, and is regarded as a special subframe by the evolved terminal for which the first radio frame is configured; and similarly, a subframe 1 is regarded as a special subframe by the early terminal, and is regarded as a downlink subframe by the evolved terminal for which the first radio frame is configured. In this way, the base station may provide, by using the first subframe configuration, a communication service for the early terminal and the evolved terminal for which the first radio frame is configured at the same time.

To better provide the communication service for the early terminal and the evolved terminal at the same time, preferably, when the first subframe configuration is notified, a first timeslot length configuration is notified for the one special subframe in the first subframe configuration, where a length of an uplink pilot timeslot in the first timeslot length configuration is a half of a length of a subframe; and when the second subframe configuration is notified, a second timeslot length configuration is notified for the one special subframe in the second subframe configuration, where the second timeslot length configuration is one of configurations of a timeslot length of the special subframe that are defined in the LTE TDD release 8. For example, the base station may broadcast, to the terminals by using a subframe configuration indication field carried in a system information block 1, that the subframe configuration 5 in Table 1 is to be used, that is, the radio frame includes 8 downlink subframes, 1 special subframe, and 1 uplink subframe; and broadcast the second timeslot length configuration to the terminals by using a timeslot length configuration indication field of the special subframe carried in the system information block 1, where the second timeslot length configuration is one of the configurations of a timeslot length of the special subframe that are defined in the LTE TDD release 8. The base station then notifies the evolved terminal of the first subframe configuration and the first timeslot length configuration of the special subframe in the first radio frame by using additional signaling, where the additional signaling may be one of or a combination of an additional system message, an additional radio resource control message, and additional physical layer control information. For the evolved terminal that is notified of the first subframe configuration and the first timeslot length configuration, in another radio frame except the first radio frame, the configuration of the timeslot length of the special subframe may be the second timeslot length configuration, and may also be the first timeslot length configuration, and the timeslot length configuration to be used may be defined in a protocol.

For a terminal that is not notified of the first subframe configuration is a terminal using the second subframe configuration, and the base station receives, in an uplink pilot timeslot of the special subframe in the first radio frame, an uplink signal sent by the terminal using the second subframe configuration.

For a user terminal that is not notified of the first subframe configuration, for example, the early terminal, although the base station can communicate with the early terminal by disguising the first subframe configuration as the second subframe configuration in a subframe alignment manner shown in FIG. 3B, actually, the base station still uses the first subframe configuration in the first radio frame. As shown in FIG. 3B, a subframe configuration 5 used by the early terminal is 8D:1S:1U, the subframe 2 is regarded as the uplink subframe U, and an uplink signal is sent in both timeslots of the subframe 2; while the subframe configuration 7 used by the evolved terminal and the base station is 9D:1S:0U, the subframe 2 is regarded as the special subframe, a length of a UpPTS of the special subframe is a half of a length of a subframe, the total length of a DwPTS and a GP is also a half of a length of a subframe, and at the same time, the base station also knows that the early terminal regards the subframe 2 as the uplink subframe. Therefore, the base station receives, only in a second timeslot of the special subframe, the uplink signal sent by the early terminal, and the evolved terminal sends an uplink signal only in the second timeslot of the special subframe.

In the first radio frame having the first subframe configuration, the special subframe in the first subframe configuration is used as a reference subframe, and the base station sends a system message and a synchronization message to the terminals in a first downlink subframe and a second downlink subframe that are closest to and before the reference subframe and a third downlink subframe and a fourth downlink subframe that are closest to and after the reference subframe. The system message and the synchronization message are sent by the base station to all the terminals. As shown in FIG. 3B, the subframe 2 is the special subframe in the first subframe configuration, the subframe 2 is used as the reference subframe, the first downlink subframe and the second downlink subframe that are closest to and before the reference subframe are the subframe 1 and a subframe 0, respectively, and the third downlink subframe and the fourth downlink subframe that are closest to and after the reference subframe are a subframe 5 and a subframe 6, respectively. That is, the base station may send a physical broadcast signal and a synchronization signal in the subframe 0, the subframe 1, the subframe 5, and the subframe 6 in the first radio frame.

By using the foregoing method, a base station provides a wireless communication service for an early terminal by using a subframe configuration 5 of 8D:1S:1U, and a special subframe in the subframe configuration, and provides the wireless communication service for an evolved terminal by using a subframe configuration 7 of 9D:1S:0U and a special subframe in the subframe configuration, so that the base station provides the communication service for the early terminal and the evolved terminal at the same time by using a first radio frame having a first subframe configuration.

FIG. 4 is a flowchart of still another wireless communication method according to an embodiment of the present invention. As shown in FIG. 4, the method provided by this embodiment includes:

Step 41: A terminal receives configuration notification information sent by a base station, where the configuration notification information is used for notifying the terminal of setting at least one radio frame to a first radio frame that meets a first subframe configuration, and the first radio frame that meets the first subframe configuration includes N−1 downlink subframes, one special subframe, and zero uplink subframe, where N is a total quantity of subframes included in one radio frame and N is a natural number greater than 1.

In order to enable the terminal to set the at least one radio frame to the first radio frame that meets the first subframe configuration, one exemplary implementation manner is that: the terminal may first receive first radio frame configuration information sent by the base station, where the first radio frame configuration information notifies the terminal of setting the at least one radio frame to a third radio frame that includes n downlink subframes and N−n dynamic subframes, or to a third radio frame that includes n−1 downlink subframes, one special subframe, and N−n dynamic subframes, where n is a natural number less than N. Then, the terminal receives first dynamic subframe indication information sent by the base station, where the first dynamic subframe indication information is used for indicating, to the terminal, a transmission direction of each dynamic subframe in the at least one third radio frame, so that the at least one third radio frame is set to the first radio frame that meets the first subframe configuration.

Further, the special subframe in the first radio frame may meet the following conditions: the special subframe in the first radio frame includes three parts: a downlink pilot timeslot, a guard period, and an uplink pilot timeslot, and a length of the uplink pilot timeslot is a half of a length of a subframe; or at least one configuration of a timeslot length of the special subframe in the first radio frame meets one of timeslot lengths of the special subframe that are defined in the LTE TDD release 8.

Step 42: After the terminal sets, according to the configuration notification message, the at least one radio frame to the first radio frame that meets the first subframe configuration, the terminal communicates with the base station in the first radio frame by using the first subframe configuration.

For example, the terminal sends uplink control information and/or uplink data to the base station in the first radio frame by using the uplink pilot timeslot of the special subframe, where the uplink control information includes at least one of the following: uplink response information, a scheduling request, and channel state information. For another example, the terminal sends a sounding signal or receives a sounding signal in the first radio frame by using a resource in the guard period of the special subframe. When sending the sounding signal, the terminal may send the sounding signal to a nearby base station, and may also send the sounding signal to another nearby terminal; and when receiving the sounding signal, the sounding signal received by the terminal may be sent by a nearby base station or may also be sent by another nearby terminal.

When the terminal communicates with the base station by using the first radio frame, a channel that is used by the terminal to send the uplink control information by using the uplink pilot timeslot of the special subframe in the first radio frame occupies one OFDM symbol in a time domain, and occupies one or more resource block units in a frequency domain, where each of the one or more resource block units transmits one modulation symbol, and the resource block unit includes one or more consecutive resource blocks. When the channel that is used by the terminal to send the uplink control information by using the uplink pilot timeslot of the special subframe in the first radio frame uses the foregoing new structure, the length of the uplink pilot timeslot of the special subframe in the first radio frame is a half of a length of a subframe; or at least one configuration of the timeslot length of the special subframe in the first radio frame meets one of the timeslot lengths of the special subframe that are defined in the LTE TDD release 8. Preferably, at least one configuration of the timeslot length of the special subframe in the first radio frame meets one of the timeslot lengths of the special subframe that are defined in the LTE TDD release 8.

If it is an LTE TDD system and N is equal to 10, before the terminal receives the configuration notification information sent by the base station, the terminal further receives second radio frame configuration information sent by the base station, where the second radio frame configuration information is used for notifying the terminal of setting the at least one radio frame to a second radio frame that meets a second subframe configuration, and the second radio frame that meets the second subframe configuration includes N−2 downlink subframes, one special subframe, and one uplink subframe, where the special subframe in the first radio frame is aligned with the uplink subframe in the second radio frame in the time domain, and a downlink subframe before the special subframe in the first radio frame is aligned with the special subframe in the second radio frame in the time domain. Further, a timeslot length of the special subframe in the second radio frame is configured to one of the timeslot lengths of the special subframe that are defined in the LTE TDD release 8, and the length of the uplink pilot timeslot of the special subframe in the first radio frame is a half of a length of a subframe. In the uplink subframe in the second radio frame, terminals using the second subframe configuration regard the subframe as a common uplink subframe, and send an uplink signal to the base station by using two timeslots of the subframe; however, the base station knows that the moment of the uplink subframe in the second radio frame is a moment of the special subframe in the first radio frame, and in the first radio frame, the base station receives, only in a second timeslot of the special subframe, the uplink signals sent by the terminals using the second subframe configuration.

For the foregoing descriptions, reference may be made to the descriptions in the embodiments corresponding to FIG. 1, FIG. 2, FIG. 3A, and FIG. 3B, and details are not described herein again.

FIG. 5 is a schematic structural diagram of a base station according to an embodiment of the present invention. As shown in FIG. 5, the base station provided by this embodiment includes: a sending module 51 and a communication module 52.

The sending module 51 is configured to send configuration notification information to a terminal, where the configuration notification information is used for notifying the terminal of setting at least one radio frame to a first radio frame that meets a first subframe configuration, and the first radio frame that meets the first subframe configuration includes N−1 downlink subframes, one special subframe, and zero uplink subframe, where N is a total quantity of subframes included in one radio frame and N is a natural number greater than 1.

In order to enable the terminal to set the at least one radio frame to the first radio frame that meets the first subframe configuration, one exemplary implementation manner is that: the sending module is specifically configured to send first radio frame configuration information to the terminal, where the first radio frame configuration information notifies the terminal of setting the at least one radio frame to a third radio frame that includes n downlink subframes and N−n dynamic subframes, or to a third radio frame that includes n−1 downlink subframes, one special subframe, and N−n dynamic subframes, where n is a natural number less than N. The sending module is further specifically configured to send first dynamic subframe indication information to the terminal, where the first dynamic subframe indication information is used for indicating, to the terminal, a transmission direction of each dynamic subframe in the at least one third radio frame, so that the at least one third radio frame is set to the first radio frame that meets the first subframe configuration.

Further, the special subframe in the first radio frame may meet the following conditions: the special subframe in the first radio frame includes three parts: a downlink pilot timeslot, a guard period, and an uplink pilot timeslot, and a length of the uplink pilot timeslot is a half of a length of a subframe; or at least one configuration of a timeslot length of the special subframe in the first radio frame meets one of timeslot lengths of the special subframe that are defined in the LTE TDD release 8.

A channel that is used by the communication module to receive uplink control information by using the uplink pilot timeslot of the special subframe occupies one OFDM symbol in a time domain, and occupies one or more resource block units in a frequency domain, where each of the one or more resource block units transmits one modulation symbol, and the resource block unit includes one or more consecutive resource blocks.

The communication module 52 is configured to communicate, by the base station, with the terminal in the first radio frame by using the first subframe configuration.

For example, the communication module is specifically configured to receive, in the first radio frame by using the uplink pilot timeslot of the special subframe, the uplink control information and/or uplink data sent by the terminal, where the uplink control information includes at least one of the following: uplink response information, a scheduling request, and channel state information.

For another example, the communication module is specifically configured to send a sounding signal or receive a sounding signal in the first radio frame by using a resource in the guard period of the special subframe.

When the base station communicates with the terminal by using the first radio frame, a channel that is used to send the uplink control information by using the uplink pilot timeslot of the special subframe in the first radio frame occupies one OFDM symbol in the time domain, and occupies one or more resource block units in the frequency domain, where each of the one or more resource block units transmits one modulation symbol, and the resource block unit includes one or more consecutive resource blocks. When the channel that is used by the terminal to send the uplink control information by using the uplink pilot timeslot of the special subframe in the first radio frame uses the foregoing new structure, the length of the uplink pilot timeslot of the special subframe in the first radio frame is a half of a length of a subframe; or at least one configuration of the timeslot length of the special subframe in the first radio frame meets one of the timeslot lengths of the special subframe that are defined in the LTE TDD release 8. Preferably, at least one configuration of the timeslot length of the special subframe in the first radio frame meets one of the timeslot lengths of the special subframe that are defined in the LTE TDD release 8.

If it is an LTE TDD system and N is equal to 10, the sending module is further specifically configured to: before the base station sends the configuration notification information to the terminal, send second radio frame configuration information to the terminal, where the second radio frame configuration information is used for notifying the terminal of setting the at least one radio frame to a second radio frame that meets a second subframe configuration, and the second radio frame that meets the second subframe configuration includes N−2 downlink subframes, one special subframe, and one uplink subframe, where the special subframe in the first radio frame is aligned with the uplink subframe in the second radio frame in the time domain, and a downlink subframe before the special subframe in the first radio frame is aligned with the special subframe in the second radio frame in the time domain. Further, a timeslot length of the special subframe in the second radio frame is configured to one of the timeslot lengths of the special subframe that are defined in the LTE TDD release 8, and the length of the uplink pilot timeslot of the special subframe in the first radio frame is a half of a length of a subframe.

For the foregoing descriptions, reference may be made to the descriptions in the embodiments corresponding to FIG. 1, FIG. 2, FIG. 3A, and FIG. 3B, and details are not described herein again.

Figure 6:
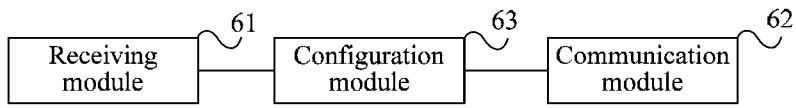
FIG. 6 is a schematic structural diagram of a terminal according to an embodiment of the present invention.

FIG. 6 is a schematic structural diagram of a terminal according to an embodiment of the present invention. As shown in FIG. 6, the terminal provided by this embodiment includes: a receiving module 61, a communication module 62, and a configuration module 63.

The receiving module 61 is configured to receive configuration notification information sent by a base station, where the configuration notification information is used for notifying the terminal of setting at least one radio frame to a first radio frame that meets a first subframe configuration, and the first radio frame that meets the first subframe configuration includes N−1 downlink subframes, one special subframe, and zero uplink subframe, where N is a total quantity of subframes included in one radio frame and N is a natural number greater than 1.

The configuration module 63 is configured to set, according to the configuration notification message, the at least one radio frame to the first radio frame that meets the first subframe configuration.

In order to enable the terminal to set the at least one radio frame to the first radio frame that meets the first subframe configuration, one exemplary implementation manner is that: the receiving module is specifically configured to receive first radio frame configuration information sent by the base station, where the first radio frame configuration information notifies the terminal of setting the at least one radio frame to a third radio frame that includes n downlink subframes and N−n dynamic subframes, or to a third radio frame that includes n−1 downlink subframes, one special subframe, and N−n dynamic subframes, where n is a natural number less than N. The receiving module is further specifically configured to receive first dynamic subframe indication information sent by the base station, where the first dynamic subframe indication information is used for indicating, to the terminal, a transmission direction of each dynamic subframe in the at least one third radio frame, so that the at least one third radio frame is set to the first radio frame that meets the first subframe configuration.

The communication module 62 is configured to communicate with the base station in the first radio frame by using the first subframe configuration.

For example, the communication module is specifically configured to send uplink control information and/or uplink data to the base station in the first radio frame by using an uplink pilot timeslot of the special subframe, where the uplink control information includes at least one of the following: uplink response information, a scheduling request, and channel state information. For another example, the communication module is specifically configured to send a sounding signal or receive a sounding signal in the first radio frame by using a resource in a guard period of the special subframe.

As described above, an LTE TDD system is an ever evolving system, and a base station supporting a dynamic subframe function also needs to be capable of supporting a terminal of an early release; and for an evolved terminal supporting the dynamic subframe function, the terminal can also communicate with the base station when the dynamic subframe function is not enabled. Further, the receiving module is further specifically configured to: before receiving the configuration notification information sent by the base station, if it is the LTE TDD system and N is equal to 10, receive second radio frame configuration information sent by the base station, where the second radio frame configuration information is used for notifying the terminal of setting the at least one radio frame to a second radio frame that meets a second subframe configuration, and the second radio frame that meets the second subframe configuration includes N−2 downlink subframes, one special subframe, and one uplink subframe, where the special subframe in the first radio frame is aligned with the uplink subframe in the second radio frame in the time domain, and a downlink subframe before the special subframe in the first radio frame is aligned with the special subframe in the second radio frame in the time domain. Further, a timeslot length of the special subframe in the second radio frame is configured to one of timeslot lengths of the special subframe that are defined in the LTE TDD release 8, and the length of the uplink pilot timeslot of the special subframe in the first radio frame is a half of a length of a subframe.

For the foregoing descriptions, reference may be made to the description in the embodiment corresponding to FIG. 4, and details are not described herein again.

In the following embodiments corresponding to FIG. 7A, FIG. 7B, FIG. 7C, and FIG. 8 to FIG. 10, a new subframe configuration is set for a terminal for which an uplink service is a dominated service.

Figure 7A:
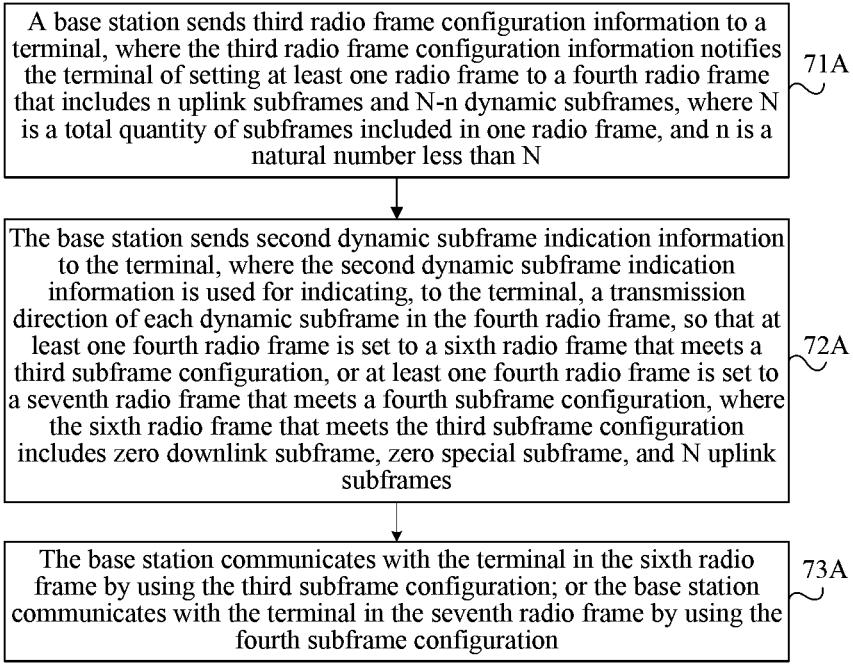
FIG. 7A is a flowchart of yet another wireless communication method according to an embodiment of the present invention.

FIG. 7A is a flowchart of yet another wireless communication method according to an embodiment of the present invention. As shown in FIG. 7A, the method provided by this embodiment includes:

Step 71A: A base station sends third radio frame configuration information to a terminal, where the third radio frame configuration information notifies the terminal of setting at least one radio frame to a fourth radio frame that includes n uplink subframes and N−n dynamic subframes, where N is a total quantity of subframes included in one radio frame, and n is a natural number less than N.

The base station may send the third radio frame configuration information to a specified terminal or each terminal in a cell. The third radio frame configuration information is used for notifying the terminal of setting the at least one radio frame to the fourth radio frame that includes the n uplink subframes and N−n dynamic subframes. Preferably, this embodiment is applicable to setting of a subframe configuration for a terminal for which an uplink service is a dominated service.

Step 72A: The base station sends second dynamic subframe indication information to the terminal, where the second dynamic subframe indication information is used for indicating, to the terminal, a transmission direction of each dynamic subframe in the fourth radio frame, so that at least one fourth radio frame is set to a sixth radio frame that meets a third subframe configuration, or at least one fourth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes.

After sending the third radio frame configuration information to the terminal, the base station sends the second dynamic subframe indication information to the terminal according to a service requirement of the terminal, so as to adjust the transmission direction of the dynamic subframe in the fourth radio frame, so that the fourth radio frame is set to the sixth radio frame that meets the third subframe configuration, or set to the seventh radio frame that meets the fourth subframe configuration. The sixth radio frame that meets the third subframe configuration includes zero downlink subframe, one special subframe, and N−1 uplink subframes, that is, a subframe configuration of the sixth radio frame is 0D:0S:(N)U. The seventh radio frame that meets the fourth subframe configuration includes zero downlink subframe, one special subframe, and N−1 uplink subframes, that is, a subframe configuration of the seventh radio frame is 0D:1S:(N−1)U. When the fourth radio frame is set to the seventh radio frame that meets the fourth subframe configuration, the third radio frame configuration information is used for setting one dynamic subframe of the N−n dynamic subframes in the fourth radio frame to a special subframe, and the other dynamic subframes to uplink subframes.

Step 73A: The base station communicates with the terminal in the sixth radio frame by using the third subframe configuration; or the base station communicates with the terminal in the seventh radio frame by using the fourth subframe configuration.

As shown in Table 1, of the subframe configuration 0 to the subframe configuration 6 defined in the existing LTE TDD, the subframe configuration 0 provides the most uplink subframes, and the subframe configuration 0 can provide 6 uplink subframes for uplink transmission. A subframe configuration 8 (0D:0S:10U) in Table 1 is the third subframe configuration provided by the present invention, and the subframe configuration 8 can provide 10 uplink subframes; and a subframe configuration 9 (0D:1S:9U) in Table 1 is the fourth subframe configuration provided by the present invention, and the subframe configuration 9 can provide 9 uplink subframes. As can be seen, both the third subframe configuration and the fourth subframe configuration enable a significant increase in an available uplink transmission resource, and can be better applicable to an uplink-dominated service, for example, video monitoring.

According to the method provided by this embodiment, a dynamic subframe is set in at least one radio frame, and then, a transmission direction of the dynamic subframe is dynamically changed, so that the radio frame set with the dynamic subframe is set to a sixth radio frame that includes zero downlink subframe, zero special subframe, and N uplink subframes, or is set to a seventh radio frame that includes zero downlink subframe, one special subframe, and N−1 uplink subframes. Because a base station provides the N uplink subframes in the sixth radio frame in which a total quantity of subframes is N, and provides the N−1 uplink subframes in the seventh radio frame in which a total quantity of subframes is N, when communication is performed with a terminal for which an uplink service is a dominated service, a waste of a radio resource can be reduced by using a subframe configuration of the sixth radio frame, thereby better adapting to a requirement of the terminal for which an uplink service is a dominated service.

Figure 7B:
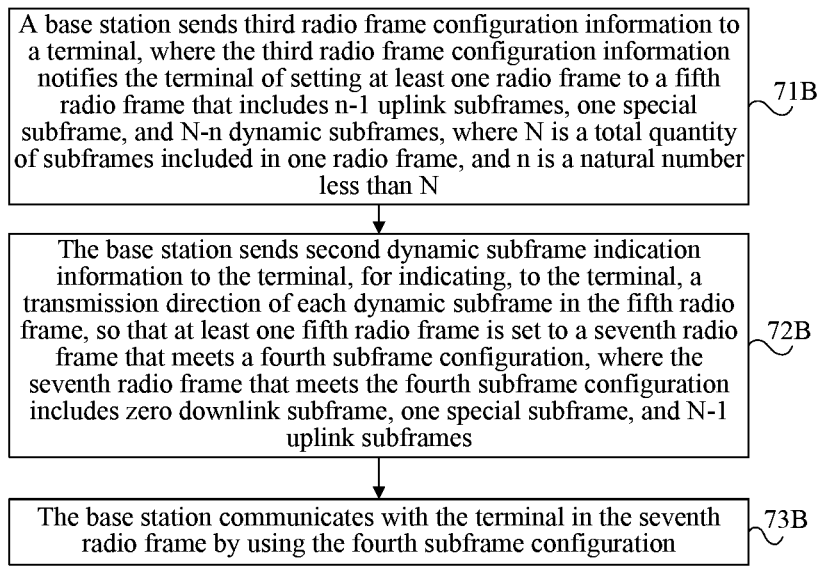
FIG. 7B is a flowchart of yet another wireless communication method according to an embodiment of the present invention.

FIG. 7B is a flowchart of yet another wireless communication method according to an embodiment of the present invention. As shown in FIG. 7B, the method provided by this embodiment includes:

Step 71B: A base station sends third radio frame configuration information to a terminal, where the third radio frame configuration information notifies the terminal of setting at least one radio frame to a fifth radio frame that includes n−1 uplink subframes, one special subframe, and N−n dynamic subframes, where N is a total quantity of subframes included in one radio frame, and n is a natural number less than N.

The base station may send the third radio frame configuration information to a specified terminal or each terminal in a cell. The third radio frame configuration information is used for notifying the terminal of setting the at least one radio frame to the fifth radio frame that includes the n−1 uplink subframes, one special subframe, and N−n dynamic subframes. Preferably, this embodiment is applicable to setting of a subframe configuration for a terminal for which an uplink service is a dominated service.

Step 72B: The base station sends second dynamic subframe indication information to the terminal, for indicating, to the terminal, a transmission direction of each dynamic subframe in the fifth radio frame, so that at least one fifth radio frame is set to a seventh radio frame that meets a fourth subframe configuration, where the seventh radio frame that meets the fourth subframe configuration includes zero downlink subframe, one special subframe, and N−1 uplink subframes.

After sending the third radio frame configuration information to the terminal, the base station sends the second dynamic subframe indication information to the terminal according to a service requirement of the terminal, so as to adjust the transmission direction of the dynamic subframe in the fifth radio frame, so that the fourth radio frame is set to the seventh radio frame that meets the fourth subframe configuration. The seventh radio frame that meets the fourth subframe configuration includes the zero downlink subframe, one special subframe, and N uplink subframes, that is, a subframe configuration of the seventh radio frame is 0D:1S:(N−1)U. When the fifth radio frame is set, according to the third radio frame configuration information, to the seventh radio frame that meets the fourth subframe configuration, the N−n dynamic subframes in the fifth radio frame are all set to uplink subframes.

Step 73B: The base station communicates with the terminal in the seventh radio frame by using the fourth subframe configuration.

As shown in Table 1, of the subframe configuration 0 to the subframe configuration 6 defined in the existing LTE TDD, the subframe configuration 0 provides the most uplink subframes, and the subframe configuration 0 can provide 6 uplink subframes for uplink transmission. The subframe configuration 9 (0D:1S:(N−1)U) in Table 1 is a new subframe configuration provided by the present invention; and the subframe configuration 9 can provide 9 uplink subframes, enables a significant increase in an available uplink transmission resource, and can be better applicable to an uplink-dominated service, for example, video monitoring.

Further, the base station sends a sounding signal or receives a sounding signal by using a resource in a guard period of the special subframe in the seventh radio frame. When sending the sounding signal, the base station may send the sounding signal to another nearby base station, and may also send the sounding signal to a nearby terminal; and when receiving the sounding signal, the sounding signal received by the base station may be sent by another nearby base station or may be sent by a nearby terminal.

Further, in the seventh radio frame, the base station receives, by using a downlink pilot timeslot of the special subframe in the seventh radio frame, at least one of the following: downlink response information, downlink scheduling information, and downlink data that are sent by the terminal.

According to the method provided by this embodiment, a dynamic subframe is set in at least one radio frame, and then, a transmission direction of the dynamic subframe is dynamically changed, so that the radio frame set with the dynamic subframe is set to a seventh radio frame that includes zero downlink subframe, zero special subframe, and N−1 uplink subframes. Because a base station provides the N−1 uplink subframes in the seventh radio frame in which a total quantity of subframes is N, when communication is performed with a terminal for which an uplink service is a dominated service, a waste of a radio resource can be reduced by using a subframe configuration of the seventh radio frame, thereby better adapting to a requirement of the terminal for which an uplink service is a dominated service.

Preferably, in the embodiment provided in FIG. 7A and the embodiment provided in FIG. 7B, during carrier aggregation, the base station sends the third radio frame configuration information and the second dynamic subframe indication information to the terminal with respect to at least one secondary component carrier; and the base station communicates with the terminal in the sixth radio frame on the secondary component carrier by using the third subframe configuration, or the base station communicates with the terminal in the seventh radio frame on the secondary component carrier by using the fourth subframe configuration. The base station sends, to the terminal on a carrier except the secondary component carrier, one of or any combination of the following messages: a system message of the secondary component carrier, synchronization information of the secondary component carrier, physical downlink control information of the secondary component carrier, and downlink response information of the secondary component carrier.

Figure 7C:
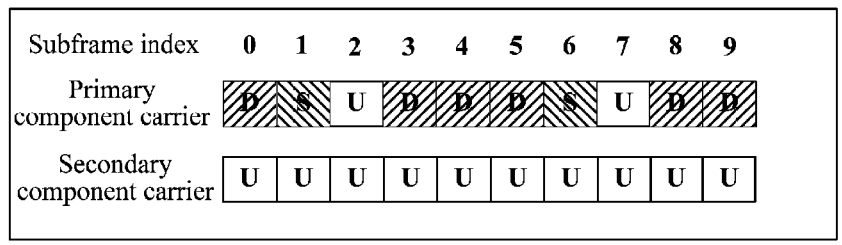
FIG. 7C is a diagram of an application scenario of FIG. 7A.

An LTE TDD system supports a carrier aggregation technology, in which the base station may configure more than one component carrier for the terminal for communication. Preferably, at least two component carriers are configured for the terminal, and include one primary component carrier (also referred to as a Primary Cell) and at least one secondary component carrier (also referred to as a Secondary Cell); and the subframe configurations 0D:1S:9U and 0D:0S:10U can be used only on the secondary component carrier. In this case, the primary component carrier may be an LTE TDD carrier using one of the seven subframe configurations shown in Table 1, may also be an LTE TDD carrier in which a dynamic subframe is set, and even may further be an LTE FDD carrier. As shown in FIG. 7C, one primary component carrier and one secondary component carrier are configured for the terminal, and in a radio frame thereof, a subframe configuration 6D:2S:2U is used on the primary component carrier, and the subframe configuration 0D:0S:10U is used on the secondary component carrier. Preferably, when at least one radio frame on one secondary component carrier uses the subframe configurations 0D:1S:9U and 0D:0S:10U to perform communication with the terminal, a system message, synchronization information, physical downlink control information, and downlink response information of the secondary component carrier are configured on another carrier, for example, the primary component carrier.

A reason why the subframe configurations 0D:1S:9U and 0D:0S:10U can be used only on the secondary component carrier is as follows: in the existing LTE TDD system, a subframe 0, a subframe 1, a subframe 5, and a subframe 6 are used for transmitting a physical layer broadcast signal and a synchronization signal; the physical layer broadcast signal and the synchronization signal are sent by the base station and used by a user equipment to access a cell to obtain time and frequency synchronization and learn system parameter configuration information; and therefore, the subframe 0, the subframe 1, the subframe 5, and the subframe 6 are always used as downlink subframes or special subframes. For the subframe configurations 0D:1S:9U and 0D:0S:10U, there is no downlink subframe, and in the 0D:1S:9U, there is only one special subframe that can be used for sending a downlink signal; therefore, it is difficult for the user equipment to directly access a carrier using these two subframe configurations and communicate with a cell. Preferably, when the subframe configuration 0D:1S:9U or 0D:0S:10U is used in at least one radio frame on one secondary component carrier for communication with the terminal, information carried on a physical uplink shared channel (PUSCH) transmitted on the secondary component carrier, physical downlink control information that carries scheduling information of the PUSCH, such as resource allocation and a transmission format, and downlink response information corresponding to transmission of the PUSCH are sent on the primary component carrier.

Figure 8:
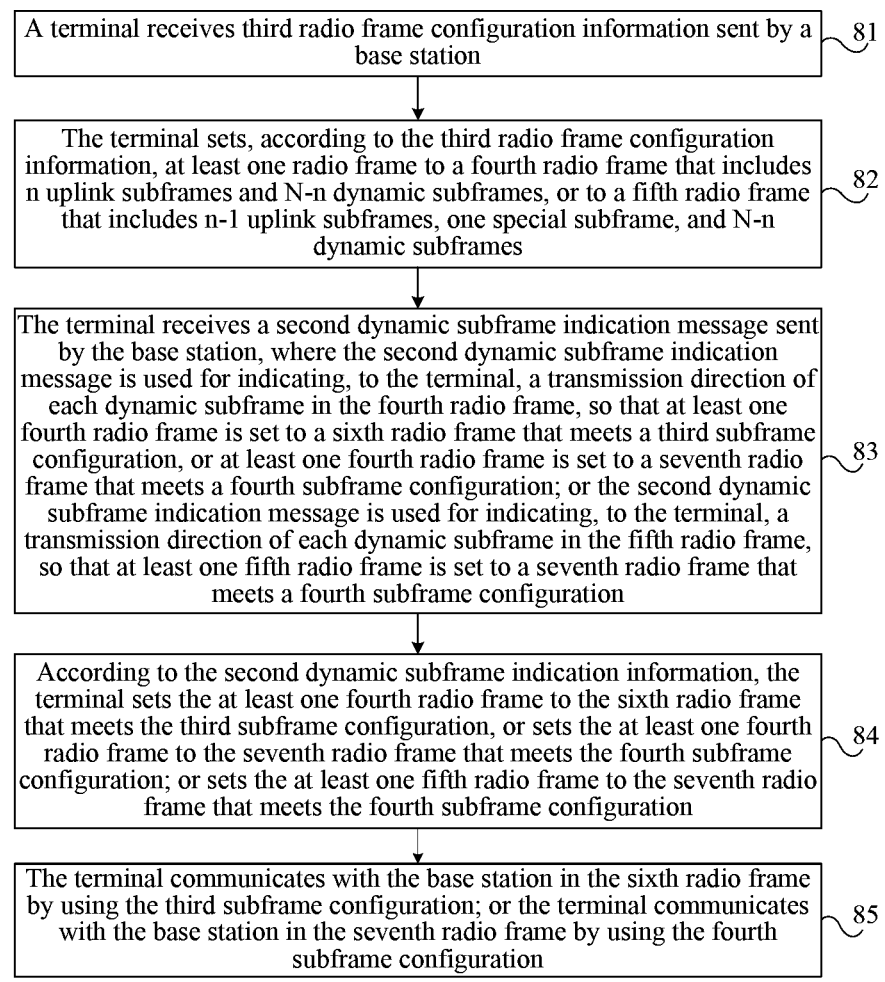
FIG. 8 is a flowchart of yet another wireless communication method according to an embodiment of the present invention.

FIG. 8 is a flowchart of yet another wireless communication method according to an embodiment of the present invention. As shown in FIG. 8, the method provided by this embodiment includes:

Step 81: A terminal receives third radio frame configuration information sent by a base station, where the third radio frame configuration information notifies the terminal of setting at least one radio frame to a fourth radio frame that includes n uplink subframes and N−n dynamic subframes, or to a fifth radio frame that includes n−1 uplink subframes, one special subframe, and N−n dynamic subframes, where N is a total quantity of subframes included in one radio frame, and n is a natural number less than N.

Step 82: The terminal sets, according to the third radio frame configuration information, the at least one radio frame to the fourth radio frame that includes the n uplink subframes and N−n dynamic subframes, or to the fifth radio frame that includes the n−1 uplink subframes, one special subframe, and N−n dynamic subframes.

Step 83: The terminal receives second dynamic subframe indication information sent by the base station, where the second dynamic subframe indication information is used for indicating, to the terminal, a transmission direction of each dynamic subframe in the fourth radio frame, so that at least one fourth radio frame is set to a sixth radio frame that meets a third subframe configuration, or at least one fourth radio frame is set to a seventh radio frame that meets a fourth subframe configuration; or the second dynamic subframe indication information is used for indicating, to the terminal, a transmission direction of each dynamic subframe in the fifth radio frame, so that at least one fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes.

Step 84: According to the second dynamic subframe indication information, the terminal sets the at least one fourth radio frame to the sixth radio frame that meets the third subframe configuration, or sets the at least one fourth radio frame to the seventh radio frame that meets the fourth subframe configuration; or sets the at least one fifth radio frame to the seventh radio frame that meets the fourth subframe configuration.

Step 85: The terminal communicates with the base station in the sixth radio frame by using the third subframe configuration; or the terminal communicates with the base station in the seventh radio frame by using the fourth subframe configuration.

For example, the terminal sends a sounding signal or receives a sounding signal by using a resource in a guard period of the special subframe in the seventh radio frame. When sending the sounding signal, the terminal may send the sounding signal to a nearby base station, and may also send the sounding signal to another nearby terminal; and when receiving the sounding signal, the sounding signal received by the terminal may be sent by a nearby base station or may be sent by another nearby terminal.

Further, during carrier aggregation, the terminal receives the third radio frame configuration information and the second dynamic subframe indication information that are sent by the base station with respect to at least one secondary component carrier. Then, the terminal communicates with the base station in the sixth radio frame on the secondary component carrier by using the third subframe configuration; or the terminal communicates with the base station in the seventh radio frame on the secondary component carrier by using the fourth subframe configuration. In addition, the terminal receives, on a carrier except the secondary component carrier, one of or any combination of the following messages sent by the base station: a system message of the secondary component carrier, synchronization information of the secondary component carrier, physical downlink control information of the secondary component carrier, and downlink response information of the secondary component carrier.

For a function of each of the foregoing modules, reference may be made to the descriptions in the embodiments corresponding to FIG. 7A, FIG. 7B, and FIG. 7C, and details are not described herein again.

Figure 9:
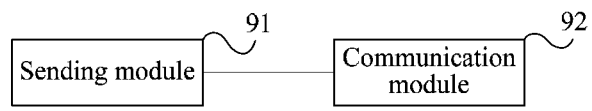
FIG. 9 is a schematic structural diagram of another base station according to an embodiment of the present invention.

FIG. 9 is a schematic structural diagram of another base station according to an embodiment of the present invention. As shown in FIG. 9, the base station provided by this embodiment includes: a sending module 91 and a communication module 92.

The sending module 91 is configured to send third radio frame configuration information to a terminal, where the third radio frame configuration information notifies the terminal of setting at least one radio frame to a fourth radio frame that includes n uplink subframes and N−n dynamic subframes, or to a fifth radio frame that includes n−1 uplink subframes, one special subframe, and N−n dynamic subframes, where N is a total quantity of subframes included in one radio frame, and n is a natural number less than N.

The sending module 91 is further configured to send second dynamic subframe indication information to the terminal, where the second dynamic subframe indication information is used for indicating, to the terminal, a transmission direction of each dynamic subframe in the fourth radio frame, so that at least one fourth radio frame is set to a sixth radio frame that meets a third subframe configuration, or at least one fourth radio frame is set to a seventh radio frame that meets a fourth subframe configuration; or the second dynamic subframe indication information is used for indicating, to the terminal, a transmission direction of each dynamic subframe in the fifth radio frame, so that at least one fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes.

The communication module 92 is configured to communicate with the terminal in the sixth radio frame by using the third subframe configuration; or communicate with the terminal in the seventh radio frame by using the fourth subframe configuration. For example, the communication module 92 may be specifically configured to send a sounding signal or receive a sounding signal by using a resource in a guard period of the special subframe in the seventh radio frame.

Further, during carrier aggregation, the sending module 91 is specifically configured to: send the third radio frame configuration information and the second dynamic subframe indication information to the terminal with respect to at least one secondary component carrier. The communication module 92 is specifically configured to communicate with the terminal in the sixth radio frame on the secondary component carrier by using the third subframe configuration; or communicate with the terminal in the seventh radio frame on the secondary component carrier by using the fourth subframe configuration. In addition, the sending module 91 is further specifically configured to send, to the terminal on a carrier except the secondary component carrier, one of or any combination of the following messages: a system message of the secondary component carrier, synchronization information of the secondary component carrier, physical downlink control information of the secondary component carrier, and downlink response information of the secondary component carrier.

For a function of each of the foregoing modules, reference may be made to the descriptions in the embodiments corresponding to FIG. 7A, FIG. 7B, and FIG. 7C, and details are not described herein again.

Figure 10:
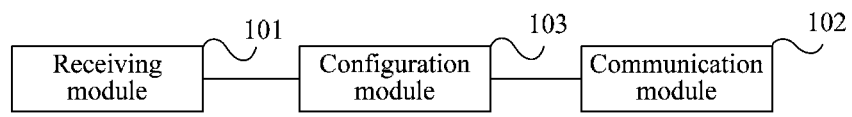
FIG. 10 is a schematic structural diagram of another terminal according to an embodiment of the present invention.

FIG. 10 is a schematic structural diagram of another terminal according to an embodiment of the present invention. As shown in FIG. 10, the terminal provided by this embodiment includes: a receiving module 101, a communication module 102, and a configuration module 103.

The receiving module 101 is configured to receive third radio frame configuration information sent by a base station, where the third radio frame configuration information notifies the terminal of setting at least one radio frame to a fourth radio frame that includes n uplink subframes and N−n dynamic subframes, or to a fifth radio frame that includes n−1 uplink subframes, one special subframe, and N−n dynamic subframes, where N is a total quantity of subframes included in one radio frame, and n is a natural number less than N.

The configuration module 103 is configured to set, according to the third radio frame configuration information, the at least one radio frame to the fourth radio frame that includes the n uplink subframes and N−n dynamic subframes, or to the fifth radio frame that includes the n−1 uplink subframes, one special subframe, and N−n dynamic subframes.

The receiving module 101 is further configured to receive second dynamic subframe indication information sent by the base station, where the second dynamic subframe indication information is used for indicating, to the terminal, a transmission direction of each dynamic subframe in the fourth radio frame, so that at least one fourth radio frame is set to a sixth radio frame that meets a third subframe configuration, or at least one fourth radio frame is set to a seventh radio frame that meets a fourth subframe configuration; or the second dynamic subframe indication information is used for indicating, to the terminal, a transmission direction of each dynamic subframe in the fifth radio frame, so that at least one fifth radio frame is set to a seventh radio frame that meets a fourth subframe configuration, where the sixth radio frame that meets the third subframe configuration includes zero downlink subframe, zero special subframe, and N uplink subframes, and the seventh radio frame that meets the fourth subframe configuration includes zero downlink subframe, one special subframe, and N−1 uplink subframes.

The configuration module 103 is further configured to: according to the second dynamic subframe indication information, set the at least one fourth radio frame to the sixth radio frame that meets the third subframe configuration, or set the at least one fourth radio frame to the seventh radio frame that meets the fourth subframe configuration; or set the at least one fifth radio frame to the seventh radio frame that meets the fourth subframe configuration.

The communication module 102 is configured to communicate with the base station in the sixth radio frame by using the third subframe configuration; or communicate with the base station in the seventh radio frame by using the fourth subframe configuration. For example, the communication module 102 is specifically configured to send a sounding signal or receive a sounding signal by using a resource in a guard period of the special subframe in the seventh radio frame.

Further, in the case of carrier aggregation, the receiving module 101 is specifically configured to: receive the third radio frame configuration information and the second dynamic subframe indication information that are sent by the base station with respect to at least one secondary component carrier. The communication module 102 is specifically configured to communicate with the base station in the sixth radio frame on the secondary component carrier by using the third subframe configuration; or communicate with the base station in the seventh radio frame on the secondary component carrier by using the fourth subframe configuration. In addition, the receiving module 101 is further specifically configured to receive, on a carrier except the secondary component carrier, one of or any combination of the following messages sent by the base station: a system message of the secondary component carrier, synchronization information of the secondary component carrier, physical downlink control information of the secondary component carrier, and downlink response information of the secondary component carrier.

For a function of each of the foregoing modules, reference may be made to the descriptions in the embodiments corresponding to FIG. 7A, FIG. 7B, and FIG. 7C, and details are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present invention.

What is claimed is:

1. A wireless communication method in a long term evolution time division duplex (LTE TDD) system the method comprising:
    sending, by a base station, configuration notification information to a terminal, wherein the configuration notification information notifies the terminal of setting a first radio frame to meet a first subframe configuration such that the first radio frame comprises (a) N−1 downlink subframes, (b) a special subframe and (c) zero uplink subframes wherein N is a total quantity of subframes comprised in one radio frame and N is a natural number greater than 1; and
    communicating, by the base station, with the terminal in the first radio frame using the first subframe configuration.

2. The method according to claim 1, wherein communicating with the terminal in the first radio frame comprises at least one of the following:
    receiving, by the base station in the first radio frame using an uplink pilot timeslot of the special subframe, at least one of uplink control information and uplink data sent by the terminal, wherein the uplink control information comprises at least one of the following: uplink response information, a scheduling request, and channel state information; and
    sending, by the base station, in the first radio frame by using a resource in a guard period of the special subframe, a sounding signal to the terminal or receiving a sounding signal sent by the terminal.

3. The method according to claim 1, wherein the special subframe in the first radio frame comprises a downlink pilot timeslot (DwPTS), a guard period (GP), and an uplink pilot timeslot (UpPTS), wherein a length of the uplink pilot timeslot is a half of a length of the special subframe.

4. The method according to claim 1, wherein N is equal to 10, the method further comprises sending, by the base station, second radio frame configuration information to the terminal,
    wherein the second radio frame configuration information notifies the terminal of setting a second radio frame to meet a second subframe configuration, and the second subframe configuration comprises N−2 downlink subframes, one special subframe, and one uplink subframe,
wherein the special subframe in the first radio frame is aligned with the uplink subframe in the second radio frame in a time domain, and a downlink subframe before the special subframe in the first radio frame is aligned with the special subframe in the second radio frame in the time domain.

5. The method according to claim 4, further comprising:
receiving, by the base station in the uplink pilot timeslot of the special subframe in the first radio frame, an uplink signal sent by the terminal using the second subframe configuration.

6. A wireless communication method in a long term evolution time division duplex (LTE TDD) system, the method comprising:
receiving, by a terminal, configuration notification information sent by a base station, wherein the configuration notification information notifies the terminal of setting a first radio frame to meet a first subframe configuration such that the first radio frame comprises (a) N−1 downlink subframes, (b) a special subframe and (c) zero uplink subframes wherein N is a total quantity of subframes comprised in one radio frame and N is a natural number greater than 1;
setting, by the terminal according to the configuration notification information, the first radio frame to meet the first subframe configuration; and
communicating, by the terminal, with the base station in the first radio frame using the first subframe configuration.

7. The method according to claim 6, wherein communicating with the base station in the first radio frame comprises at least one of the following:
sending, by the terminal, at least one of uplink control information and uplink data to the base station in the first radio frame using an uplink pilot timeslot of the special subframe, wherein the uplink control information comprises at least one of the following: uplink response information, a scheduling request, and channel state information; and
sending, by the terminal, a sounding signal or receiving a sounding signal in the first radio frame using a resource in a guard period of the special subframe.

8. The method according to claim 6, wherein the special subframe in the first radio frame comprises three parts: a downlink pilot timeslot (DwPTS), a guard period (GP), and an uplink pilot timeslot (UpPTS), wherein a length of the uplink pilot timeslot is a half of a length of the special subframe.

9. The method according to claim 6, wherein N is equal to 10, the method further comprises receiving, by the terminal, second radio frame configuration information sent by the base station,
wherein the second radio frame configuration information notifies the terminal of setting a second radio frame to meet a second subframe configuration, and the second subframe configuration comprises N−2 downlink subframes, one special subframe, and one uplink subframe,
wherein the special subframe in the first radio frame is aligned with the uplink subframe in the second radio frame in a time domain, and a downlink subframe before the special subframe in the first radio frame is aligned with the special subframe in the second radio frame in the time domain.

10. The method according to claim 9, further comprising:
sending, by the terminal using the second subframe configuration, an uplink signal to the base station in the uplink pilot timeslot of the special subframe in the first radio frame.

11. A base station comprising a processor and computer readable memory containing instructions for execution by the processor such execution of the instructions by the processor configures the processor to:
send configuration notification information to a terminal, wherein the configuration notification information notifies the terminal of setting a first radio frame to meet a first subframe configuration such that the first radio frame comprises (a) N−1 downlink subframes, (b) a special subframe and (c) zero uplink subframes wherein N is a total quantity of subframes comprised in one radio frame and N is a natural number greater than 1; and
communicate with the terminal in the first radio frame using the first subframe configuration.

12. The base station according to claim 11, wherein the processor is further configured to implement at least one of the following:
(a) receiving, in the first radio frame using an uplink pilot timeslot of the special subframe, at least one of uplink control information and uplink data sent by the terminal, wherein the uplink control information comprises at least one of the following: uplink response information, a scheduling request, and channel state information; and
(b) sending a sounding signal or receiving a sounding signal in the first radio frame by using a resource in a guard period of the special subframe.

13. The base station according to claim 11, wherein the special subframe in the first radio frame used by the communication module comprises a downlink pilot timeslot (DwPTS), a guard period (GP), and an uplink pilot timeslot (UpPTS), wherein a length of the uplink pilot timeslot is a half of a length of the special subframe.

14. The base station according to claim 11, wherein N is equal to 10 and the processor is further configured to:
send second radio frame configuration information to the terminal before sending the configuration notification information to the terminal,
wherein the second radio frame configuration information notifies the terminal of setting a second radio frame to meet a second subframe configuration, and the second subframe configuration comprises N−2 downlink subframes, one special subframe, and one uplink subframe,
wherein the special subframe in the first radio frame is aligned with the uplink subframe in the second radio frame in a time domain, and a downlink subframe before the special subframe in the first radio frame is aligned with the special subframe in the second radio frame in the time domain.

15. The base station according to claim 14, wherein the processor is further configured to: if the terminal uses the second subframe configuration, receive, in the uplink pilot timeslot of the special subframe in the first radio frame, an uplink signal sent by the terminal.

16. A terminal comprising a processor and computer readable memory containing instructions for execution by the processor such execution of the instructions by the processor configures the processor to:
receive configuration notification information sent by a base station, wherein the configuration notification information notifies the terminal of setting a first radio frame to meet a first subframe configuration such that the first radio frame comprises (a) N−1 downlink subframes, (b) a special subframe and (c) zero uplink subframes wherein N is a total quantity of subframes comprised in one radio frame and N is a natural number greater than 1;

set, according to the configuration notification information, the first radio frame to meet the first subframe configuration; and communicate with the base station in the first radio frame using the first subframe configuration.

17. The terminal according to claim 16, wherein the processor is further configured to implement at least one of the following:
   (a) sending at least one of uplink control information and uplink data to the base station in the first radio frame by using an uplink pilot timeslot of the special subframe, wherein the uplink control information comprises at least one of the following: uplink response information, a scheduling request, and channel state information; and
   (b) sending a sounding signal or receiving a sounding signal in the first radio frame using a resource in a guard period of the special subframe.

18. The terminal according to claim 16, wherein the special subframe in the first radio frame comprises three parts: a downlink pilot timeslot (DwPTS), a guard period (GP), and an uplink pilot timeslot (UpPTS), wherein a length of the uplink pilot timeslot is a half of a length of the special subframe.

19. The terminal according to claim 16, wherein N is equal to 10 and the processor is further configured to:
   receive second radio frame configuration information sent by the base station before receiving the configuration notification information sent by the base station,
   wherein the second radio frame configuration information notifies the terminal of setting a second radio frame to meet a second subframe configuration, and the second subframe configuration comprises N−2 downlink subframes, one special subframe, and one uplink subframe,
   wherein the special subframe in the first radio frame is aligned with the uplink subframe in the second radio frame in a time domain, and a downlink subframe before the special subframe in the first radio frame is aligned with the special subframe in the second radio frame in the time domain.

20. The terminal according to claim 19, wherein the processor is further configured to: if the terminal uses the second subframe configuration, send an uplink signal to the base station in the uplink pilot timeslot of the special subframe in the first radio frame.

* * * * *